United States Patent [19]
Takami et al.

[11] Patent Number: 5,272,022
[45] Date of Patent: Dec. 21, 1993

[54] NON-AQUEOUS ELECTROLYTE SECONDARY BATTERY

[75] Inventors: Norio Takami; Takahisa Ohsaki, both of Yokohama; Norihito Kurisu, Kawasaki; Kuniaki Inada, Chigasaki, all of Japan

[73] Assignees: Kabushiki Kaisha Toshiba, Kawasaki; Toshiba Battery Co., Ltd., Tokyo, both of Japan

[21] Appl. No.: 766,203

[22] Filed: Sep. 27, 1991

[30] Foreign Application Priority Data

Sep. 28, 1990 [JP] Japan .................. 2-259084

[51] Int. Cl.[5] .......................................... H01M 10/40
[52] U.S. Cl. ........................ 429/197; 429/194; 429/210; 429/213; 429/218
[58] Field of Search ............ 429/194, 197, 201, 213, 429/218

[56] References Cited

U.S. PATENT DOCUMENTS 4,668,595  5/1987  Yoshino et al.
4,702,977  10/1987 Hiratsuka et al. ................ 429/194
4,957,833  9/1990  Daifuku et al. ................... 429/197

FOREIGN PATENT DOCUMENTS 0249331  12/1987 European Pat. Off.
0398689  11/1990 European Pat. Off.

OTHER PUBLICATIONS

J. Electrochem. Soc., vol. 137, No. 7, Jul. 1990, pp. 2009-2013, Fong et al: Studies of Lithium Intercalation into Carbons . . . .

*Primary Examiner*—Prince Willis, Jr.
*Assistant Examiner*—M. Nuzzolillo
*Attorney, Agent, or Firm*—Oblon, Spivak, McClelland, Maier & Neustadt

[57] ABSTRACT

A nonaqueous electrolyte secondary battery having an enhanced capacity and a long charge/discharge cycle life is disclosed. The nonaqueous electrolyte secondary battery comprises a positive electrode housed in a case and containing a chalcogen compound as an active material, a negative electrode arranged in the case such that a separator is sandwiched between the positive and negative electrodes and containing a carbonaceous material as an active material that absorbs and discharges lithium ions and a nonaqueous electrolyte contained in the case and prepared by dissolving 0.5 mol/l to 1.5 mol/l of electrolytic salt selected from the group consisting of $LiPF_6$, $LiBF_4$, $LiAsF_6$ and $LiCF_3SO_3$ in a solvent mixture comprising at least one first nonaqueous solvent selected from the group consisting of noncyclic carbonate, cyclic carbonate, $\gamma$-butyrolactone and acetonitrile and at least one second nonaqueous solvent containing selected from the group consisting of 1,2-diethoxyethane, 1,2-dimethoxyethane, 1,2-ethoxymethoxyethane, 1,3-dimethoxypropane, diethylether and tetrahydrofurane, the amount of said second nonaqueous solvent in the solvent mixture being so determined that the mol ratio ([S]/[Li]) of the second nonaqueous solvent [S] to lithium ions [Li] is 0.5 to 3.

15 Claims, 2 Drawing Sheets

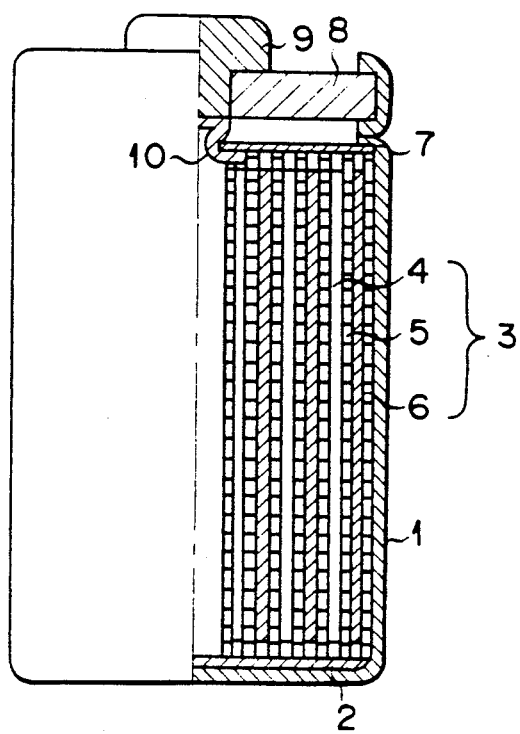
F I G. 1
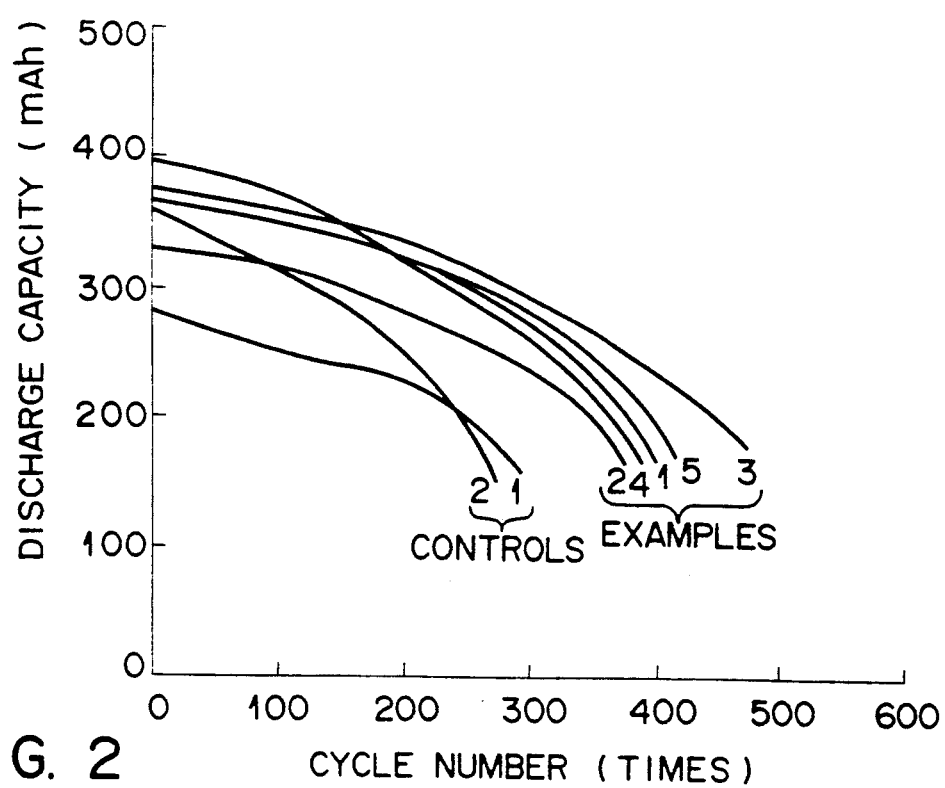
F I G. 2

NON-AQUEOUS ELECTROLYTE SECONDARY BATTERY

BACKGROUND OF THE INVENTION

1. Field of the Invention

The present invention relates to a nonaqueous electrolyte secondary battery and, more particularly, to a nonaqueous electrolyte secondary battery containing an improved a nonaqueous electrolyte.

2. Description of the Related Art

In recent years, a nonaqueous electrolyte battery has attracted attention as a high energy density battery. Of such nonaqueous electrolyte batteries, a primary battery using a light metal such as lithium, sodium, or aluminum as a negative electrode active material and manganese dioxide ($MnO_2$), carbon fluoride [$(CF)n$], thionyl chloride ($SOCl_2$), or the like as a positive electrode active material is already widely used as a power source of a timepiece or a backup battery of a memory.

In addition, as the sizes and weights of various types of electronic equipment such as communication equipment have been decreased, a demand for a secondary battery having a high energy density which can be suitably used as a power source of such equipment has been increased, and a nonaqueous electrolyte secondary battery has been actively studied. For example, a nonaqueous electrolyte secondary battery using lithium as a negative electrode and an electrolyte prepared by dissolving an electrolytic salt such as $LiClO_4$, $LiBF_4$, $LiAsF_6$, or $LiPF_6$ in a nonaqueous solvent such as propylene carbonate (PC), 1,2-dimethoxyethane (DME), γ-butyrolactone (γ-BL), or tetrahydrofuran (THF) has been studied. In addition, a compound which topochemically reacts with lithium such as $TiS_2$, $MoS_2$, $V_2O_5$, or $V_6O_{13}$ has been studied as a positive electrode material.

The above secondary battery, however, has not been put into practical use yet. This is mainly because a charge/discharge efficiency of the battery is low and its number of charge/discharge times or cycle life is short. The reason for this is assumed that lithium as a negative electrode is degraded due to a reaction with an electrolyte. That is, lithium dissolved in an electrolyte as lithium ions upon discharge reacts with a solvent and its surface is partially deactivated when it precipitates upon charge. Therefore, when charge/discharge is repeated, lithium is precipitated in the form of dendrites or small spheres, or is separated from a collector.

On the other hand, nonaqueous electrolyte secondary batteries realized by utilizing a carbonaceous material that can absorbed and discharge lithium to be used as an active material of a negative electrode are disclosed in U.S. Pat. Nos. 4,668,595 and 4,702,977. The U.S. Pat. No. 4,668,595 also describes the use of tetrahydrofuran, γ-butyrolactone, dimethoxyethane, propylene carbonate, ethylene carbonate or a mixture thereof as a nonaqueous solvent for preparing a nonaqueous electrolyte.

SUMMARY OF THE INVENTION

It is the object of the present invention to provide a nonaqueous electrolyte secondary battery that has a negative electrode which is capable of sufficiently absorbing and discharging lithium and can effectively suppress any degradation of the nonaqueous electrolyte contains in it and that of the negative electrode by the nonaqueous electrolyte, thereby enhacing the overall capacity and improving charge/discharge cycle life.

According to the invention, there is provided a nonaqueous electrolyte secondary battery comprising a positive electrode housed in a case and containing a chalcogen compound as an active material, a negative electrode arranged in the case in which a separate is sandwiched between the positive and negative electrodes and containing as an active material a carbonaceous material for absorbing and discharging lithium ions and a nonaqueous electrolyte housed in the case, the nonaqueous electrolyte is prepared by dissolving 0.5 mol/l to 1.5 mol/l of an electrolytic salt selected from the group consisting of lithium phosphate hexafluoride ($LiPF_6$) lithium borofluoride ($LiBF_4$), lithium arsenate hexafluoride ($LiAsF_6$) and lithium trifluorometasulfonate ($LiCF_3SO_3$) in a solvent mixture comprising at least one first nonaqueous solvent selected from the group consisting of noncyclic carbonate, cyclic carbonate, γ-butyrolactone and acetonitrile and at least one second nonaqueous solvent selected from the group consisting of 1,2-diethoxyethane, 1,2-dimethoxyethane, 1,2-ethoxymethoxyethane, 1,3-dimethoxypropane, diethylether and tetrahydrofurane and that the amount of the second nonaqueous solvent in the solvent mixture is so determined that the mol ratio ($[S]/[Li]$) of the second nonaqueous solvent [S] to lithium ions [Li] is 0.5 to 3. Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates presently preferred embodiments of the invention and, together with the general description given above and the detailed description of the preferred embodiments given below, serves to explain the principles of the invention.

FIG. 1 is a partial sectional view showing a nonaqueous electrolyte secondary battery according to the present invention;

FIG. 2 is a graph showing a change in discharge capacity as a function of a cycle number in a nonaqueous electrolyte secondary battery of each of Examples 1 to 5 and Controls 1 and 2.

DETAILED DESCRIPTION OF THE INVENTION

Figure 3:
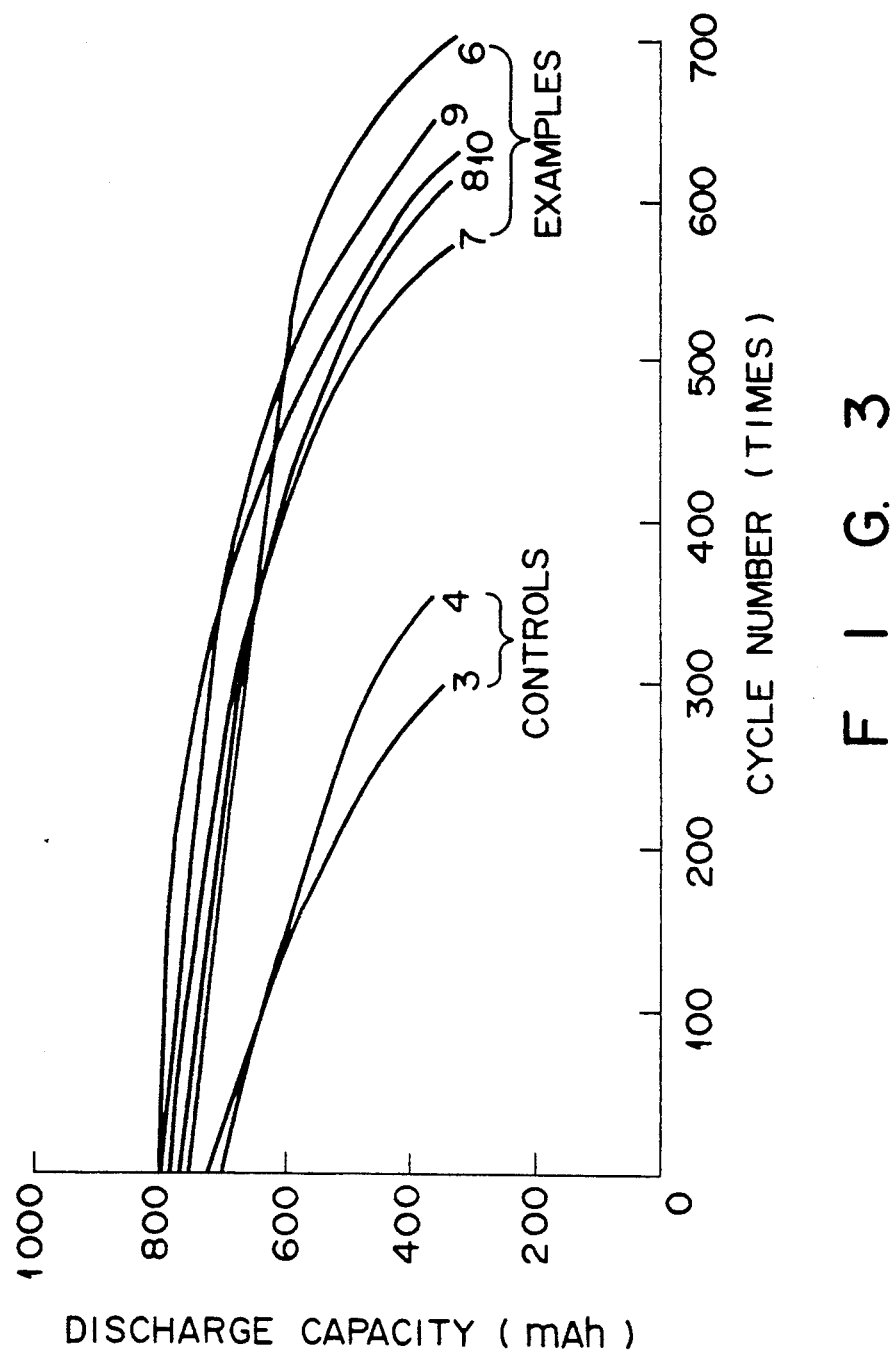
FIG. 3 is a graph showing a change in discharge capacity as a function of a cycle number in a nonaqueous electrolyte secondary battery of each of Examples 6 to 10 and Controls 3 and 4.

A nonaqueous electrolyte secondary battery according to the present invention will be described below with reference to FIG. 1.

Referring to FIG. 1, a cylindrical case 1 having a bottom houses an insulator 2 arranged on its bottom and electrodes 3. The electrodes 3 have a structure in which a band-like member obtained by stacking a positive electrode 4, a separator 5, and a negative electrode 6 in the order named is spirally wound so that the negative electrode 6 is located outside. The case 1 contains a nonaqueous electrolyte. Insulating paper 7 having an opening formed in its central portion is placed above the electrodes 3 housed in the case 1. An insulating opening sealing plate 8 is arranged at an upper opening portion of the case 1 and liquid-tightly fixed to the case 1 by calking the upper opening portion inwardly. A positive terminal 9 is fitted in the center of the plate 8. One end of a positive lead 10 is connected to the positive electrode 4 and the other end to the positive terminal 9. The negative electrode 6 is connected to the case 1 as a negative terminal via a negative lead (not shown).

The case 1 is typically made of stainless steel.

The positive electrode 4 contains a chalcogen compound as an active material. More specifically, the positive electrode 4 is realized by preparing a mixture of the chalcogen compound, an organic binder material and a conductive material, kneading the mixture into a sheet and pressing it against a current collector member.

Example of the chalcogen compound are manganese dioxide, a lithium-manganese composite oxide, a lithium cobalt oxide, a lithium nickel cobalt oxide, lithium containing non-crystalline vanadium pentaoxide, titanium disulfide and molybdenum disulfide. Of these, the lithium cobalt oxide is particularly advantageous as it can raise the potential of the positive electrode and hence the voltage of the battery.

Example of the organic binder material is polytetrafluoroethylene. Examples of the conductive material are acetylene black and graphite. The current collector member is used of aluminum foil, stainless steel foil and nickel foil.

The negative electrode 6 contains as an active material a carbonaceous material for absorbing and discharging lithium ions. Specifically, the negative electrode 6 is realized by preparing a mixture of the carbonaceous material and an organic binder material and applying the mixture to a current collector member to coat the latter with the former.

Examples of the carbonaceous material are coke, sintered synthetic resin, carbon fiber, thermally decomposable gaseous carbon, mesophase pitch-like carbon and mesocarbon microbeads. The carbonaceous material may have been charged with lithium ions in advance. When the chalcogen material such as titanium disulfide not containing lithium at all is used, the carbonaceous material charged with lithium ions is particularly preferable.

Example of the organic binder material is an ethylenepropylene copolymer. The current collector member is used of copper foil, nickel foil or stainless steel foil.

The nonaqueous electrolyte is typically prepared by dissolving an electrolytic salt into a solvent mixture, which will be described in detail below.

Example of the electrolytic salt are $LiPF_6$, $LiBF_4$, $LiAsF_6$ and $LiCF_3SO_3$. When the battery is excessively charged, the electrolytic salt is less likely oxidative destruction than lithium perchlorate ($LiClO_4$) which is normally used for conventional nonaqueous electrolyte secondary batteries. $LiPF_6$ is particularly advantageous because of its high molar conductivity. The electrolytic salt should be dissolved in the solvent mixture in amount of 0.5 mol/l to 1.5 mol/l. The dissolution amount of the electrolytic salt in the solvent mixture is limited for following reason. That is, if the dissolution amount of the electrolytic salt is less than 0.5 mol/l, the conductivity of the nonaqueous electrolyte can not be increased. If the dissolution amount of the electrolytic salt is 1.5 mol/l or more, the conductivity of the nonaqueous electrolyte can not be increased and its chemical stability is decreased. The dissolution amount of the electrolytic salt is preferably 0.75 mol/l to 1.25 mol/l.

The solvent mixture comprises at least one first nonaqueous solvent selected from group consisting of noncyclic carbonate, cyclic carbonate, γ-butyrolactone and acetonitrile and at least one second nonaqueous solvent selected from group consisting of 1,2-diethoxyethane, 1,2-dimethoxyethane, 1,2-ethoxymethoxyethane, 1,3-dimethoxypropane, diethylether and tetrahydrofurane.

The first nonaqueous solvent has a high dielectric constant and is capable of dissolving the electrolytic salt. Examples of the noncyclic carbonate are dimethylcarbonate and diethylcarbonate. Examples of the cyclic carbonate are ethylenecarbonate, propylenecarbonate and butylenecarbonate. Preferable the first nonaqueous solvent is mixture of ethylenecarbonate and propylenecarbonate or mixture of propylenecarbonate and diethylcarbonate.

The second nonaqueous solvent has low viscosity and increases the conductivity of the nonaqueous electrolyte. Of the candidate compounds of the second nonaqueous solvent, 1,2-diethoxyethane is recommended because it have a higher flash point than 1,2-dimethoxyethane and hence is convenient to handle.

The amount of the second nonaqueous solvent in the nonaqueous electrolyte is so determined that the mol ratio ($[S]/[Li]$) of the second nonaqueous solvent $[S]$ to lithium ions $[Li]$ is 0.5 to 3. The mol ratio is limited for following reason. That is, if the mol ratio is less than 0.5, the viscosity of the nonaqueous electrolyte undesirably rises to reduce its conductivity. If the mol ratio is 3 or more, the viscosity of the nonaqueous electrolyte is reached to increase its conductivity, although the capacity of the negative electrode to absorb and discharge lithium ions is reduced and the duration of effective charge/discharge cycles is curtailed. The mol ratio $[S]/[Li]$ is preferably 1 to 2.

A nonpolar benzene or toluene may be added to the nonaqueous electrolyte by less than 30 vol % in order to reduce the viscosity of the nonaqueous electrolyte having a composition as described above.

In the secondary battery of the present invention, positive and negative electrodes each containing a specified active material are housed in a case with a separator interposed between these electrodes. It should be noted that the nonaqueous electrolyte described above, which is housed in the case, permits increasing the amount of absorption and discharge of lithium ions performed by the carbonaceous material used as an active material of the negative electrode, leading to a high charge/discharge efficiency. This makes it possible to obtain a nonaqueous electrolyte secondary battery of a high capacity and a long cycle life.

The carbonaceous material used as an active material of the negative electrode absorbs lithium ions present in the nonaqueous electrolyte. In this case, the periphery of the lithium ion is selectively coordinated by the nonaqueous solvent having a large donner number, with the result that the nonaqueous solvent is taken up together with the lithium ion between adjacent carbon atoms of the carbonaceous material. It follows that the absorbed amount of lithium ions and the behavior of the decomposition reaction of the nonaqueous solvent are changed depending on the size and molecular weight of the coordinating nonaqueous solvent as well as by the number of coordinations. As described previously, the nonaqueous electrolyte used in the present invention is provided by a solvent mixture consisting of the first nonaqueous solvent such as propylene carbonate and the second nonaqueous solvent such as 1,2-dimethoxyethane. Since the donner number of the second nonaqueous solvent is larger than that of the first nonaqueous solvent, the lithium ion is selectively coordinated by the second nonaqueous solvent.

Such being the situation, it is important to determine appropriately the mixing amount of the second solvent. As described previously, nonaqueous electrolyte is prepared by dissolving 0.5 to 1.5 mol/l of the lithium salt in the solvent mixture. In the present invention, the mixing amount of the second solvent is determined in view of the lithium salt-dissolving capability of the solvent mixture such that the molar ratio ([S]/[Li]) of the second solvent [S] to the lithium ion [Li] falls within a range of between 0.5 and 3. Where the molar ratio ([S]/[Li]) falls within the range defined in the present invention, it is possible to diminish the amounts of the second solvent and the lithium ion taken up between adjacent carbon atoms of the carbonaceous material acting as the active material of the negative electrode. In addition, the function of the second nonaqueous solvent to improve the conductivity of the nonaqueous electrolyte is not impaired. It follows that the amount of the lithium ions absorbed by and charged from the carbonaceous material can be increased. Further, it is possible to suppress the decomposition by the reducing reaction within the carbonaceous material and the intercalation into the carbonaceous material, with the result that it is possible to suppress the deterioration in the surface and crystal structure of the carbonaceous material during the charge/discharge cycles. Among the second nonaqueous solvents, 1,2-diethoxyethane exhibits a relatively weak coordinating force relative to the lithium ion and, thus, is prominently effective for suppressing the deterioration of the carbonaceous material.

It should also be noted that the electrolyte dissolved in the solvent mixture used in the present invention, i.e., $LiPF_6$, $LiBF_4$, $LiAsF_6$ or $LiCF_3SO_3$, is less likely to be decomposed by oxidation when the battery is excessively charged, compared with the conventional electrolyte of $LiClO_4$. Thus, the lithium salt specified in the present invention as the electrolyte permits suppressing the deterioration of the nonaqueous electrolyte during the charge/discharge cycles.

To reiterate, the amount of the lithium ions absorbed by and released from the carbonaceous material providing the active material of the negative electrode can be increased in the present invention. Also, the present invention permits suppressing the structural deterioration of the negative electrode and also permits suppressing the deterioration of the nonaqueous electrolyte. It follows that the present invention provides a nonaqueous electrolyte secondary battery of a large capacity and a long cycle life.

DETAILED DESCRIPTION OF THE PREFERRED EMBODIMENTS

Now the present invention will be described in greater detail by way of examples that represents the best modes of carrying out the invention.

EXAMPLE 1

80 wt % of a lithium cobalt oxide ($Li_xCoO_2$) powder, 15 wt % of acetylene black powder and 5 wt % of polytetrafluoroethylene powder were mixed to prepare a mixture and the mixture was applied to a current collector member made of aluminum foil to form a sheet-like positive electrode.

98 wt % of carbonaceous material powder obtained by sintering powdered phenol resin in nitrogen gas at 1,700° C. for 2 hours and 2 wt % of ethylene-propylene copolymer were mixed to prepare a mixture and the mixture was applied to a current collector member made of nickel foil to form a sheet-like negative electrode.

The positive electrode, a separator formed a polypropylene porous film and the negative electrode were stacked in order named and spirally wound so that the negative electrode was located outside, thereby manufacturing electrodes.

In addition, 1.0 mol/l of $LiPF_6$ was dissolved in a solvent mixture consisting of ethylene carbonate, propylene carbonate and 1,2-dimethoxyethane (mixing volume ratio = 40:40:20) to prepare a nonaqueous electrolyte. The mol ratio ([S]/[Li]) of 1,2-dimethoxyethane [S] to lithium ions [Li] in the nonaqueous electrolyte was approximately 1.9.

The electrodes and the nonaqueous electrolyte were housed in a cylindrical stainless steel case having a bottom to assemble the above-mentioned nonaqueous electrolyte secondary battery as showing in FIG. 1.

EXAMPLE 2

1.0 mol/l of $LiBF_4$ was dissolved in a solvent mixture consisting of ethylene carbonate, propylene carbonate and 1,2-dimethoxyethane (mixing volume ratio = 40:40:20) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 3

1.0 mol/l of $LiAsF_6$ was dissolved in a solvent mixture consisting of ethylene carbonate, propylene carbonate and 1,2-dimethoxyethane (mixing volume ratio = 40:40:20) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

EXAMPLE 4

1.0 mol/l of $LiPF_6$ was dissolved in a solvent mixture consisting of ethylene carbonate, γ-butyrolactone and 1,2-dimethoxyethane (mixing volume ratio = 40:40:20) to prepare a nonaqueous electrolyte. The resultant nonaqueous electrolyte and electrodes similar to those used in Example 1 were housed in a cylindrical stainless steel having a bottom to assemble the nonaqueous electrolyte secondary battery shown in FIG. 1.

EXAMPLE 5

1.0 mol/l of $LiPF_6$ was dissolved in a solvent mixture consisting of ethylene carbonate, propylene carbonate and tetrahydrofurane (mixing volume ratio = 40:40:20) to prepare a nonaqueous electrolyte. The mol ratio ([S]/[Li]) of tetrahydrofurane [S] to lithium ions [Li] in the nonaqueous electrolyte was approximately 2.5. The resultant nonaqueous electrolyte and electrodes similar to those used in Example 1 were housed in a cylindrical stainless steel case having a bottom to assemble to the nonaqueous electrolyte secondary battery shown in FIG. 1.

Control 1

1.0 mol/l of $LiPF_6$ was dissolved in a solvent mixture consisting of ethylene carbonate and propylene carbonate (mixing volume ratio=50:50) to prepare a nonaqueous electrolyte. The resultant nonaqueous electrolyte and electrodes similar to those used in Example 1 were housed in a cylindrical stainless steel case having a bottom to assemble the nonaqueous electrolyte secondary battery shown in FIG. 1.

Control 2

1.0 mol/l of $LiPF_6$ was dissolved in a solvent mixture consisting of propylene carbonate and 1,2-dimethoxyethane (mixing volume ratio=50:50) to prepare a nonaqueous electrolyte. The mol ratio ([S]/[Li]) of 1,2-dimethoxyethane to lithium ions [Li]in the nonaqueous electrolyte was approximately 4.8. The resultant nonaqueous electrolyte and electrodes similar to those used in Example 1 were housed in a cylindrical stainless steel case having a bottom to assemble the nonaqueous electrolyte secondary battery shown in FIG. 1.

Charge/discharge was repeatedly performed for each of the nonaqueous electrolyte secondary batteries of Examples 1 to 5 and Controls 1 and 2 with charge current of 50 mA to 4.2 V and discharge current of 50 mA, and a discharge capacity and a cycle number each of battery were measured. The measurement results are shown in FIG. 2.

As seen from FIG. 2, the nonaqueous electrolyte secondary batteries of Examples 1 to 5 used a nonaqueous electrolyte having the mol ratio ([S]/[Li]) of 0.5 to 3 are showed a battery capacity and a cycle life much greater than those of the batteries obtained by Controls 1 and 2. In particularly, the battery of each of Examples 1, 3 and 5 has a high capacity and a very long cycle life.

EXAMPLE 6

98 wt % of carbonaceous material powder consisting of mesocarbon microbeads and 2 wt % of ethylene-propylene copolymer were mixed to prepare a mixture, and the mixture was applied to an electric collector member made of nickel foil to form a sheet-like negative electrode. A positive electrode similar to it used in Example 1, a separator consisting of a polypropylene porous film and the negative electrode were stacked in the mentioned order and spirally wound so that the negative electrode was located outside, thereby manufacturing electrodes.

In addition, 1.0 mol/l of $LiPF_6$ was dissolved in a solvent mixture consisting of ethylene carbonate, propylene carbonate and 1,2-diethoxyethane (mixing volume ratio=40:40:20) to prepare a nonaqueous electrolyte. The mol ratio ([S]/[Li]) of 1,2-diethoxyethane [S]to lithium ions [Li]in the nonaqueous electrolyte was approximately 1.5.

The electrodes and the nonaqueous electrolyte were housed in a cylindrical stainless steel case having a bottom to assemble the nonaqueous electrolyte secondary battery shown in FIG. 1.

EXAMPLE 7

1.0 mol/l of $LiBF_4$ was dissolved in a solvent mixture consisting of diethyl carbonate, propylene carbonate and 1,2-dimethoxyethane (mixing volume ratio=20:60:20) to prepare a nonaqueous electrolyte. The resultant nonaqueous electrolyte and electrodes similar to those used in Example 6 were housed in a cylindrical stainless steel case having a bottom to assemble the nonaqueous electrolyte secondary battery shown in FIG. 1.

EXAMPLE 8

1.0 mol/l of $LiAsF_6$ was dissolved in a solvent mixture consisting of ethylene carbonate, $\gamma$-butyrolactone and 1,2-dimethoxyethane (mixing volume ratio=40:40:20) to prepare a nonaqueous electrolyte. The resultant nonaqueous electrolyte and electrodes similar to those used in Example 6 were housed in a cylindrical stainless steel case having a bottom to assemble the nonaqueous electrolyte secondary battery shown in FIG. 1.

EXAMPLE 9

1.0 mol/l of $LiPF_6$ was dissolved in a solvent mixture consisting of propylene carbonate, diethyl carbonate and 1,2-dimethoxyethane (mixing volume ratio=60:20:20) to prepare a nonaqueous electrolyte. The resultant nonaqueous electrolyte and electrodes similar to those used in Example 6 were housed in a cylindrical stainless steel case having a bottom to assemble the nonaqueous electrolyte secondary battery shown in FIG. 1.

EXAMPLE 10

1.0 mol/l of $LiPF_6$ was dissolved in a solvent mixture consisting of diethyl carbonate, propylene carbonate and 1,2-ethoxymethoxyethane (mixing volume ratio=20:60:20) to prepare a nonaqueous electrolyte. The mol ratio ([S]/[Li]) of 1,2-ethoxymethoxyethane [S]to lithium ions [Li]in the nonaqueous electrolyte was approximately 1.7. The resultant nonaqueous electrolyte and electrodes similar to those used in Example 6 were housed in a cylindrical stainless steel case having a bottom to assemble the nonaqueous electrolyte secondary battery shown in FIG. 1.

Control 3

1.0 mol/l of $LiPF_6$ was dissolved in a solvent mixture consisting of propylene carbonate and 1,2-dimethoxyethane (mixing volume ratio=50:50) to prepare a nonaqueous electrolyte. The mol ratio ([S]/[Li]) of 1.2-dimethoxyethane [S]to lithium ions [Li]in the nonaqueous electrolyte was approximately 4.8. The resultant nonaqueous electrolyte and electrodes similar to those used in Example 6 were housed in a cylindrical stainless steel case having a bottom to assemble the nonaqueous electrolyte secondary battery shown in FIG. 1.

Control 4

1.0 mol/l of $LiPF_6$ was dissolved in a solvent mixture consisting of propylene carbonate and 1,2-diethoxyethane (mixing volume ration=50:50) to prepare a nonaqueous electrolyte. The mol ratio ([S]/[Li]) of 1,2-diethoxyethane [S]to lithium ions [Li]in the nonaqueous electrolyte was 3.6. The resultant nonaqueous electrolyte and electrodes similar to those used in Example 6 were housed in a cylindrical stainless steel case having a bottom to assemble the nonaqueous electrolyte secondary battery shown in FIG. 1.

Charge/discharge was repeatedly performed for each of the nonaqueous electrolyte secondary battery of Examples 6 to 10 and Controls 3 and 4 with charge current of 120 mA to 4.2V and discharge current of 120 mA, and a discharge capacity and a cycle number each of battery were measured. The measurement results are shown in FIG. 3.

As seen from FIG. 3, the nonaqueous electrolyte secondary batteries of Examples 6 to 10 used a nonaqueous electrolyte having a mol ratio ([S]/[Li]) of 0.5 to 3 are showed a battery capacity and a cycle life much greater than those of the batteries obtained by Controls 3 and 4. In particularly, the battery of each of Examples 6, 8 and 10 has a high capacity and a very long cycle life.

As is apparent from the above description, a nonaqueous electrolyte secondary battery according to the present invention has an enhanced capacity and a long charge/discharge cycle life.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A nonaqueous electrolyte secondary battery comprising:
   a positive electrode housed in a case and containing a chalcogen compound as an active material;
   a negative electrode arranged in said case such that a separator is sandwiched between said positive and negative electrodes therein and containing a carbonaceous material as an active material that absorbs and discharges lithium ions; and
   a nonaqueous electrolyte contained in said case and prepared by dissolving 0.5 mol/l to 1.5 mol/l of an electrolytic salt selected from the group consisting of lithium phosphate hexafluoride ($LiPF_6$), lithium borofluoride ($LiBF_4$), lithium arsenate hexafluoride ($LiAsF_6$) and lithium trifluorometasulfonate ($LiCF_3SO_3$) in a solvent mixture comprising at least one first nonaqueous solvent selected from the group consisting of noncyclic carbonate, cyclic carbonate, γ-butyrolactone and acetonitrile and at least one second nonaqueous solvent selected from the group consisting of 1,2-diethoxyethane, 1,2-dimethoxyethane, 1,2-ethoxymethoxyethane, 1,3-dimethoxypropane, diethylether and tetrahydrofurane, the amount of said second nonaqueous solvent in the solvent mixture being so determined that the mol ratio ([S]/[Li]) of the second nonaqueous solvent [S] to lithium ions [Li] is 0.5 to 3.

2. The battery according to claim 1, wherein said chalcogen compound is a lithium cobalt oxide.

3. The battery according to claim 1, wherein said electrolytic salt is $LiPF_6$.

4. The battery according to claim 1, wherein the dissolution amount of said electrolytic salt in said solvent mixture is 0.75 mol/l to 1.25 mol/l.

5. The battery according to claim 1, wherein said noncyclic carbonate is dimethyl carbonate or diethyl carbonate.

6. The battery according to claim 1, wherein said cyclic carbonate is ethylene carbonate, propylene carbonate or butylene carbonate.

7. The battery according to claim 6, wherein said first nonaqueous solvent is a mixture of ethylene carbonate and propylene carbonate.

8. The battery according to claim 5 or 6, wherein said first nonaqueous solvent is a mixture of propylene carbonate and diethyl carbonate.

9. The battery according to claim 1, wherein said second nonaqueous solvent is 1,2-diethoxyethane or 1,2-dimethoxyethane.

10. The battery according to claim 1, wherein the amount of said second nonaqueous solvent in said solvent mixture is determined such that the mol ratio ([S]/[Li]) of said second nonaqueous solvent [S] to said lithium ions [Li] is 1 to 2.

11. The battery according to claim 1, wherein said solvent mixture contains benzene or toluene.

12. The battery according to claim 1, wherein said solvent mixture contain ethylene carbonate, propylene carbonate and 1,2-dimethoxyethane.

13. The battery according to claim 1, wherein said solvent mixture contains ethylene carbonate, γ-butyrolactone, and 1,2-dimethoxyethane.

14. The battery according to claim 1, wherein said solvent mixture contains ethylene carbonate, propylene carbonate and 1,2-diethoxyethane.

15. The battery according to claim 1, wherein said solvent mixture contains diethyl carbonate, propylene carbonate and 1,2-ethoxymethoxyethane.

* * * * *